US 6,735,035 B1

(12) United States Patent
Smith et al.

(10) Patent No.: US 6,735,035 B1
(45) Date of Patent: May 11, 2004

(54) METHOD AND APPARATUS FOR ENABLING COLD TEMPERATURE PERFORMANCE OF A DISK

(75) Inventors: Gordon James Smith, Rochester, MN (US); George Willard Van Leeuwen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 09/714,952

(22) Filed: Nov. 20, 2000

(51) Int. Cl.$^7$ .................. G11B 15/18; G11B 17/00; G11B 19/02
(52) U.S. Cl. .............. 360/69; 360/73.03; 360/75; 360/97.02
(58) Field of Search .................. 360/69, 73.03, 360/75, 97.02; 700/79, 299, 300

(56) References Cited

U.S. PATENT DOCUMENTS

| | | | |
|---|---|---|---|
| 4,860,135 A | * | 8/1989 | Cain .................. 360/97.02 |
| 5,434,737 A | * | 7/1995 | Miura .................. 360/133 |
| 6,055,120 A | | 4/2000 | Schirle |
| 6,078,158 A | * | 6/2000 | Heeren et al. .......... 318/430 |
| 6,078,455 A | | 6/2000 | Enarson et al. |
| 6,088,662 A | | 7/2000 | Flinsbaugh et al. |
| 6,400,522 B1 | * | 6/2002 | Milligan ................ 360/69 |
| 6,469,930 B1 | * | 10/2002 | Murray ............... 365/185.08 |

FOREIGN PATENT DOCUMENTS

| | | |
|---|---|---|
| EP | 0541852 A1 | 5/1993 |
| JP | 59-152996 | 10/1984 |
| JP | 63-48395 | 4/1988 |
| JP | 63-170571 | 7/1988 |
| JP | 64-069276 | 3/1989 |
| JP | 64-085588 | 3/1989 |
| JP | 1-123454 | 8/1989 |
| JP | 01-298972 | 12/1989 |
| JP | 05166291 A2 | 2/1993 |
| JP | 06-139749 | 5/1994 |
| JP | 06-327241 | 11/1994 |
| JP | 09-009659 | 1/1997 |
| JP | 10-243672 | 9/1998 |
| JP | 2000224891 A2 | 11/2000 |
| JP | 2001069774 A | 3/2001 |

OTHER PUBLICATIONS

IBM Technical Disclosure Bulletin, vol. 38, No. 09, Sep. 1995, pp. 93–94.
"Hard Disk Drive for Low Temperature" by H. Ando et al.

\* cited by examiner

*Primary Examiner*—David Hudspeth
*Assistant Examiner*—Jason Olson
(74) *Attorney, Agent, or Firm*—Rabin & Berdo, PC (57) ABSTRACT

In cold weather, the higher torque required for normal spinning operation of a spindle motor assembly in a direct access storage device due to the increased viscosity of the grease, is overcome by localizing the heating to the spindle motor assembly to reduce the viscosity of the grease, and then let a disk driven self heat during and after spin-up of the spindle motor assembly.

52 Claims, 8 Drawing Sheets

METHOD AND APPARATUS FOR ENABLING COLD TEMPERATURE PERFORMANCE OF A DISK

BACKGROUND OF THE INVENTION

1. Field of the Invention

The present invention relates to a method and apparatus for enabling cold temperature performance of a disk.

2. Background of the Invention

There are environmental conditions where applying power and attempting to spin up a magnetic disk drive storage device can lead to extensive and often irreversible damage and data loss. Among such detrimental environmental conditions is cold temperatures. Manufacturers often warn users of computer systems, particularly personal computers and laptop computers, to avoid turning on "cold" or "frozen" systems until the unit has warmed up to a "safe" temperature. Unfortunately, such warnings are often unheeded, or completely ignored, by users. Thus, it is imperative to protect such computer systems from damage and/or data loss resulting from such ill-advised attempts at turning on "cold" or "frozen" systems before the unit has been sufficiently warmed up.

Direct access storage devices, or hard drives, are widely used in modern computers. Disk drive units, often incorporating stacked, commonly rotated rigid magnetic disks for example, are used for storage of data in magnetic form on the disk surfaces. Data may be recorded in radially spaced data information tracked arrays on the surfaces of the disks. Transducer heads driven in a path towards and away from the drive axis write data to the disks and read data from the disks.

Figure 2:
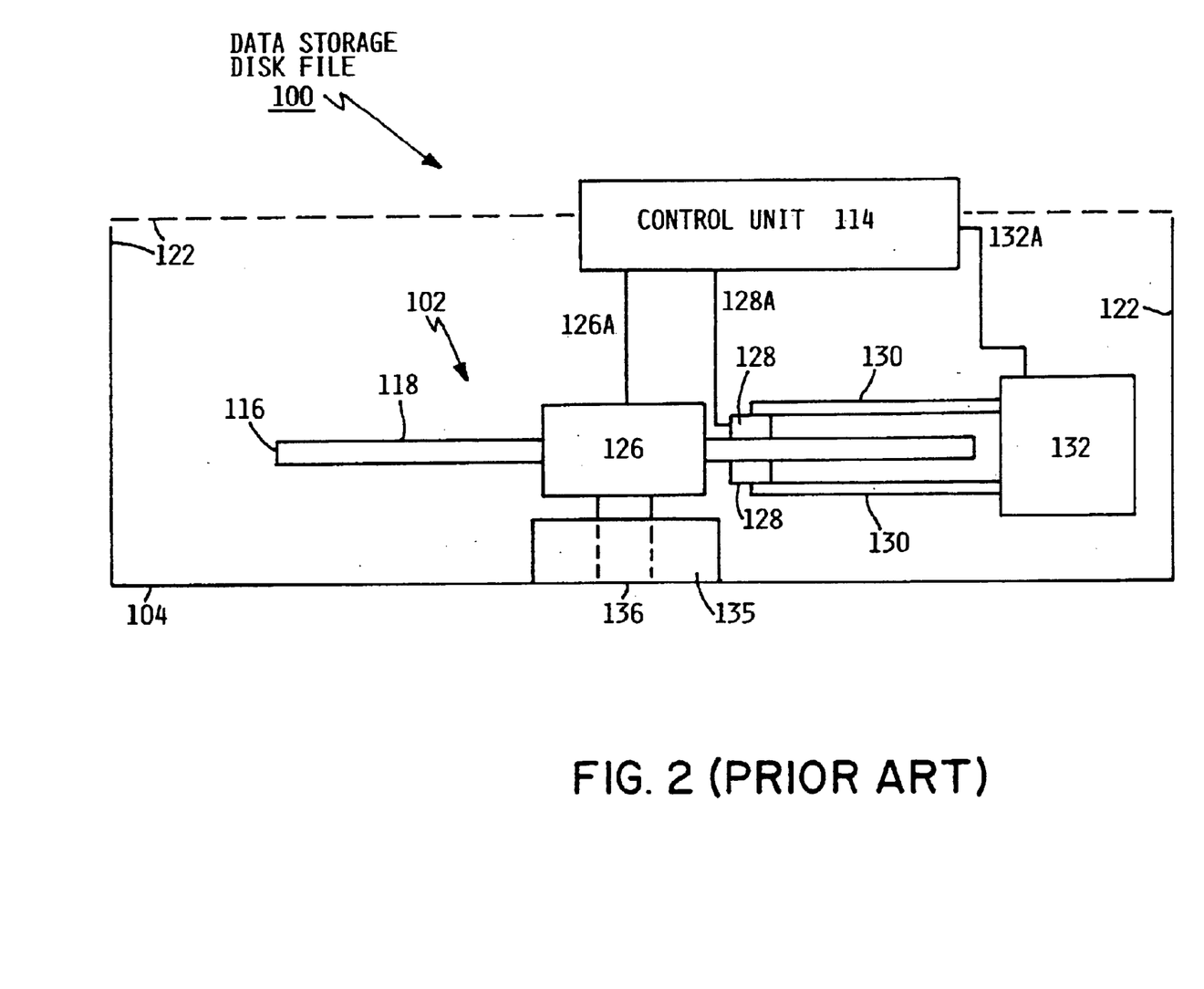
FIG. 2 is a schematic diagram of an example of a data storage disk file.

FIG. 2 shows an example of a data storage disk file 100 that includes a magnetic disk drive unit 102 and interface control unit 114. Magnetic disk drive unit 102 includes at least one disk 116 having at least one magnetic surface 118 which may be contained within a disk drive enclosure 122. The disk 116 may be mounted for rotation on and by integrated spindle motor assembly 126. Information on each magnetic disk surface 118 may be read from or written to the disk surface 118 by a corresponding transducer head assembly 128 which may be movable in a path having a radial component across the rotating disk surface 118. Each transducer head assembly 128 may be carried by a suspension arm assembly 130. The suspension arm assemblies 130 are bundled together for simultaneous pivotal movement by actuator coil motor 132 cooperating with an internal magnet and core assembly. Drive signals applied to the actuator coil motor 132 cause the suspension arm assemblies 130 to move in unison to position the transducer head assemblies 128 in correspondence with information storage tracks on the disk surfaces 118 on which information may be written or read.

In particular, disk drive unit 102 has two major mechanical mechanisms that may be affected by cold temperatures. The first mechanism is actuator coil motor 132, where read/write heads are disposed, and the second mechanism is spindle motor assembly 126. The problem that cold weather poses to the spindle motor assembly 126 is that, since a torque constant increases as the temperature thereof decreases, grease in the bearings thereof becomes more viscous thereby affecting the performance and ability to move or spin the disk drive.

Current solutions for operation of disk drive unit 102 in cold temperatures include attaching a resistive heater to the top cover 122 of the disk drive unit 102, wherein the heater may be a resistive wire encapsulated in captan sheet. A thermistor, or equivalent temperature sensor, may then attached to the disk drive unit 102 or adjacent thereto to thereby measure ambient temperature. During system power up, the temperature of the disk drive unit 102 is measured before spin-up of the actuator coil motor 132 or spindle motor assembly 126. If the measured temperature is below a predetermined minimum threshold temperature, current (either DC, AC or pulsed current) may be applied to the heater, and the temperature may be measured once more. The steps described above are repeated as necessary until the measured temperature equals or exceeds the minimum threshold temperature. Then the heater may be turned off, and power may be applied to the disk drive unit 102. The actuator coil motor 132 and spindle motor assembly 126, while spinning and read/write accessing, should then provide sufficient heat dissipation to self-heat the disk drive. However, if the temperature of the disk drive unit 102 drops below a set-limit (i.e., 10° C. below the minimum threshold temperature for example), then the heater may once again be turned on until temperature of the disk drive unit 102 equals or exceeds the minimum threshold temperature. This method requires a significant amount of power to completely heat up the entire disk drive unit 102 prior to spin up of both the actuator coil motor 132 and the spindle motor assembly 126.

Thus, it is essential to overcome the problems posed by cold weather environments on the normal operation of hard disk drives, which until present has been done by merely avoiding turning on "cold" or "frozen" systems until the unit has warmed up to a "safe" temperature. Since such warnings are often unheeded, or completely ignored, by users, it is imperative to protect such computer systems from damage and/or data loss resulting from such ill-advised attempts at turning on "cold" or "frozen" systems before the unit has been sufficiently warmed up.

SUMMARY OF THE INVENTION

It is, therefore, a principle of object of this invention to provide a method and apparatus for enabling cold temperature performance of a disk.

It is another object of the invention to provide a method and apparatus for enabling cold temperature performance of a disk that solves the above-mentioned problems.

These and other objects of the present invention are accomplished by the method and apparatus for enabling cold temperature performance of a disk disclosed herein.

In view of the fact that spindle torque requirements increase as a temperature thereof decreases, the present invention overcomes the higher torque required due to the increased viscosity of the grease by localizing the heating to the spindle motor assembly. Thus, the viscosity of the grease is reduced, and therefore the present invention enables self-heating by the disk drive during and after spin-up of the spindle motor assembly.

According to a first example embodiment of the present invention a small current (DC, AC or pulsed current) may be applied to one or more windings of a stator of a disk drive unit. Due to the electrical resistance within the windings, heat may be dissipated in the spindle motor assembly, and the dissipated heat may be conducted into the bearing and bearing grease. The grease may then warm to a minimum threshold temperature, thus providing a safe environment for normal operation of spindle motor assembly.

The amount of time required for the current, including any one of a constant DC current AC current and pulsed current, to be applied to the windings of the stator of the disk drive unit may be determined utilizing one of the following. First, in consideration of a voltage measurement of the spindle motor assembly, experimental measurements may be made on spindle motor assembly to determine the change in the resistance of the windings as they change with temperature depending on the change in current or voltage on a given winding. Such measurements may be stored in a table within a controller of the disk drive unit and once the given resistance value is obtained, normal spinning operation of spindle motor assembly may commence.

Secondly, a thermistor may be provided on a card of the disk drive unit. The controller first determines the disk drive card temperature prior to power up. If the temperature disk drive unit card is less than the minimum threshold temperature, the controller performs a table look up for the temperature that is closest to the measured temperature. The controller then applies a current to the stator windings for the given time as specified within the table prior to spin-up of the spindle motor assembly.

The spin-up times would be experimentally determined for each motor by measuring the bearing temperature versus time of current injection into the winding(s) of the spindle motor stator.

Lastly, a closed loop feedback to the controller may be provided for the heating cycle. The thermistor attached to the spindle motor would be polled when initial power is applied to the disk drive unit. If the measured temperature is less than the minimum threshold temperature, the controller may apply a current, including any one of a DC, AC or pulsed current, to the spindle motor windings, and then continuously monitor the thermistor temperature until the threshold minimum thermistor temperature has been achieved to thereby enable normal spin-up of the spindle motor assembly.

A second example embodiment of the present invention is similar to the first example embodiment described above except that, instead of applying a current, including any one of a DC, AC or pulsed current, the phases of spindle motor assembly are excited to rock the spindle motor assembly in a "back-and-forth" manner, while avoiding spindle fretting, such that heat is dissipated within the windings and, as a result, heat may be dissipated into the grease. The amount of time that the phases are rocked to generate heat to be dissipated within the windings may be determined by the exemplary methodologies described above.

A third example embodiment of the present invention directly applies a heater to the outside of the spindle motor assembly, or may be alternatively integrated within spindle motor assembly, adjacent to the bearing assembly. The heater and thermistor may be cabled within the same cable bundle as the multiple phases and neutral, and would be focused to heat only the spindle motor assembly as quickly and efficiently as possible.

DETAILED DESCRIPTION OF PREFERRED EMBODIMENTS

Before beginning a detailed description of the invention, it should be noted that, when appropriate, like reference numerals and characters may be used to designate identical, corresponding or similar components in differing figure drawings. Further, in the detailed description to follow, example embodiments and values may be given, although the present invention is not limited thereto.

Figure 3:
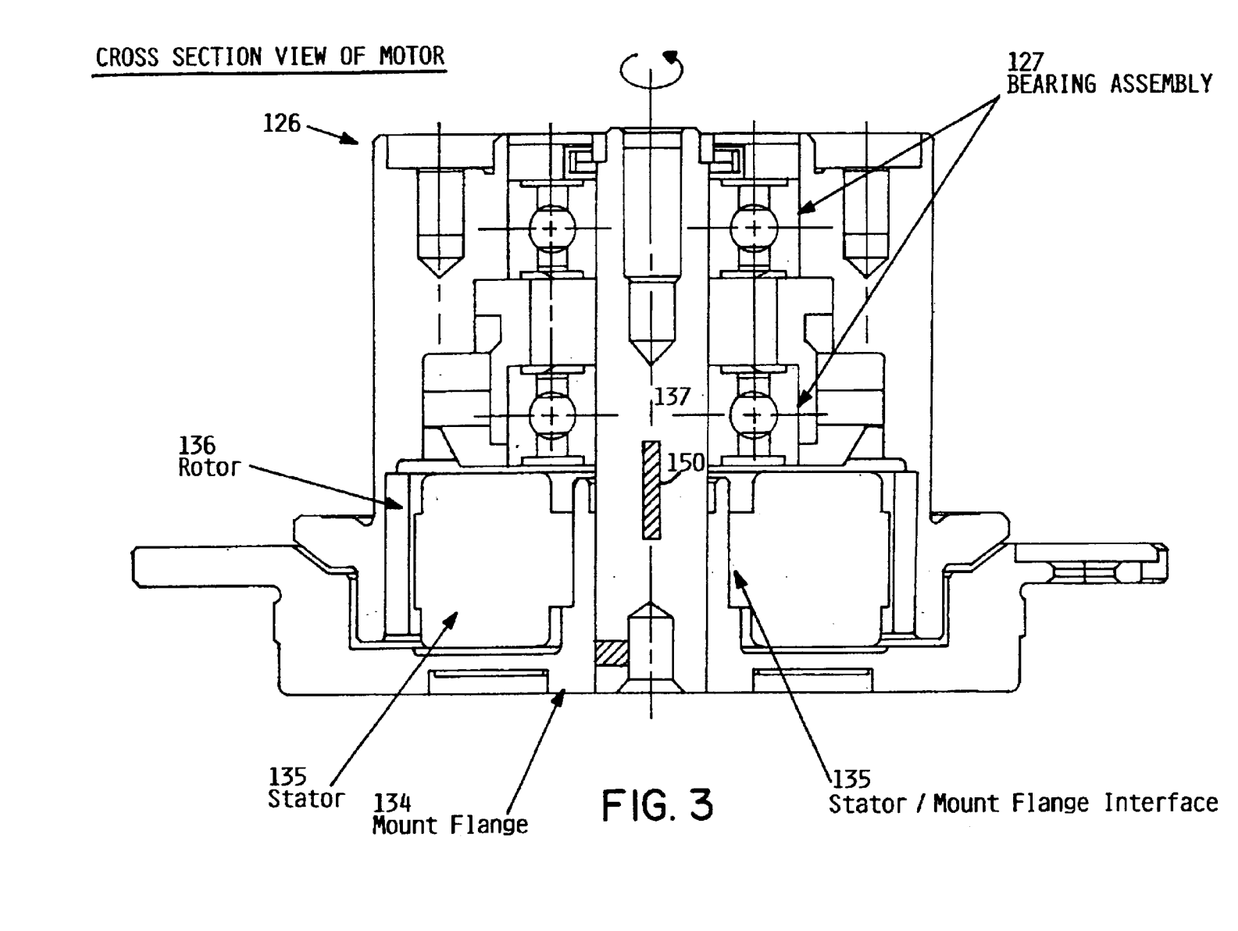
FIG. 3 is a cross-sectional view of an example of a spindle motor assembly according to an example embodiment of the present invention.

According to a first example embodiment of the present invention, which may be applied to an exemplary data storage disk file such as data storage disk file 100 shown in FIG. 2, a current, including any one of a small constant DC current, AC current or pulsed current, may be applied to one or more windings of stator 135 of the disk drive unit 102. Due to the electrical resistance within the windings, heat may be dissipated in the spindle motor assembly 126, and that heat may be conducted into the bearing and bearing grease. Bearing assembly 127 is shown in FIG. 3, which is a cross-sectional view of the spindle motor assembly 126. The grease may then warm to a minimum threshold temperature, thus providing a safe environment for normal operation of spindle motor assembly 126.

The amount of time required for the current to be applied to the windings of the stator of the disk drive unit 102 may be determined utilizing one of the following. First, in consideration of a voltage measurement of the spindle motor assembly 126, experimental measurements may be made on spindle motor assembly 126 to determine the change in the resistance of the windings as they change temperature depending on the change in current or voltage on a given winding. Such measurements may be stored in a table within the control unit 114, and once the given resistance value is obtained, normal operation of spindle motor assembly 126 may commence.

Figure 4:
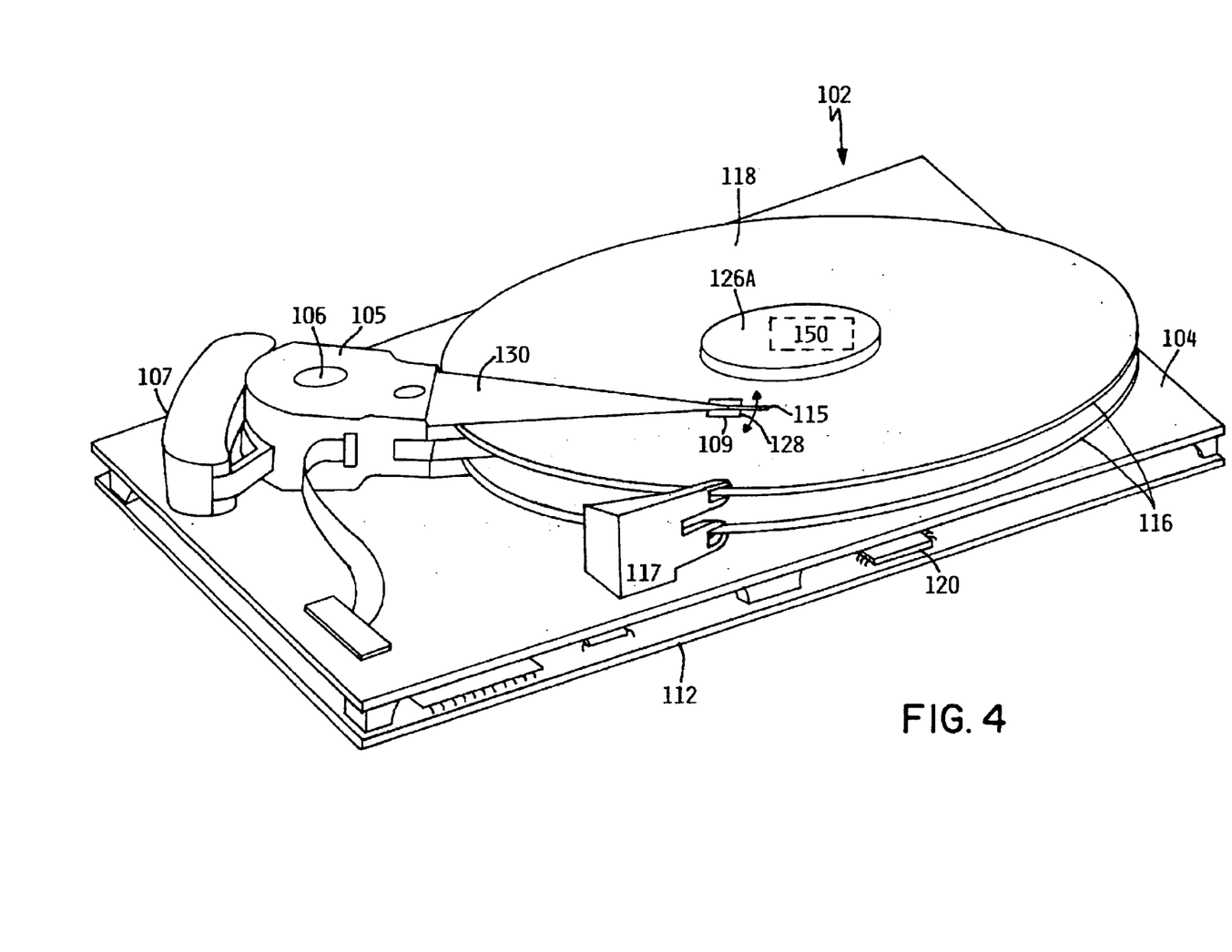
FIG. 4 is an example of a rotating magnetic disk drive storage device, for use in accordance with an example embodiment of the present invention.

Secondly, a thermistor may be provided on the card of the disk drive unit 102. FIG. 4 shows a drawing of the rotating magnetic disk drive storage device 100, shown in FIG. 2, for use in accordance with an example embodiment of the present invention. Disk drive unit 102 includes rotatable disks 116, which are rigidly attached to hub assembly or spindle 126A, which may be mounted on disk drive base 104. Spindle 126A and disks 116 are driven by spindle motor assembly 126 at a constant rotational velocity. Spindle motor assembly 126 is not shown in FIG. 4. Data may be recorded on the surfaces 118 of disk 116. Actuator assembly 105, which may be situated to one side of the disk 116, rotates through an arc about shaft 106 parallel to the access of spindle 126A, driven by electromagnetic motor 107, to thereby position the transducer heads 128. The cover 122, shown in FIG. 2, mate with base 104 to enclose and protect the disk and actuator assemblies. Electronic modules for controlling the operation of the drive and communicating with other devices, including a host computer, are mounted on circuit card 112. Circuit card 112 may be mounted outside of the enclosure formed by the base 104 and the cover 122, although the circuit card 112 may also be mounted inside of the enclosure, or a portion of the electronics may be mounted inside of the enclosure with other portions thereof mounted outside of the enclosure. A plurality of head/suspension assemblies 130 are rigidly attached to prongs of actuator 105. An aerodynamic slider 109 with transducer heads 128 may be located at the end of each head/suspension assembly 108 which may be adjacent to disk surface 118. In order to protect the disk surface and heads, and to promote easier starting of the spindle motor assembly 126 from a dead stop, the slider and transducer head assembly 109 may be "unloaded" when the disk drive unit 102 is not in use, and therefore actuator 105 may be rotated away from the center of disk 116 so that a projecting finger 115 at the end of each suspension 108 engages a respective ramp surface of ramp assembly 117, lifting the slider 109 away from the disk surface 116. Thermistor 120 is mounted outside of enclosure formed by base 104 and cover 122, although, similar to circuit card 112, the thermistor may be mounted inside such enclosure.

Controller 114 may first determine the disk drive card temperature prior to power up. If the temperature disk drive unit card is less than the minimum threshold temperature, controller 114 may perform a table look up for the temperature that is closest to the measured temperature. Controller 114 may then apply a current to the stator windings for the time specified within the table prior to spin-up of the spindle motor assembly 126.

In general, the thermistor would be polled when initial power is applied to the disk drive unit 102. If the temperature measured temperature is less than the minimum threshold temperature, the controller 114 may apply a current to the spindle motor windings, and then continuously monitor the thermistor temperature until a threshold minimum thermistor temperature has been achieved to thereby enable normal spin-up of the spindle motor assembly 126. The applied current may be any one of a DC, AC or pulsed current.

Figure 1:
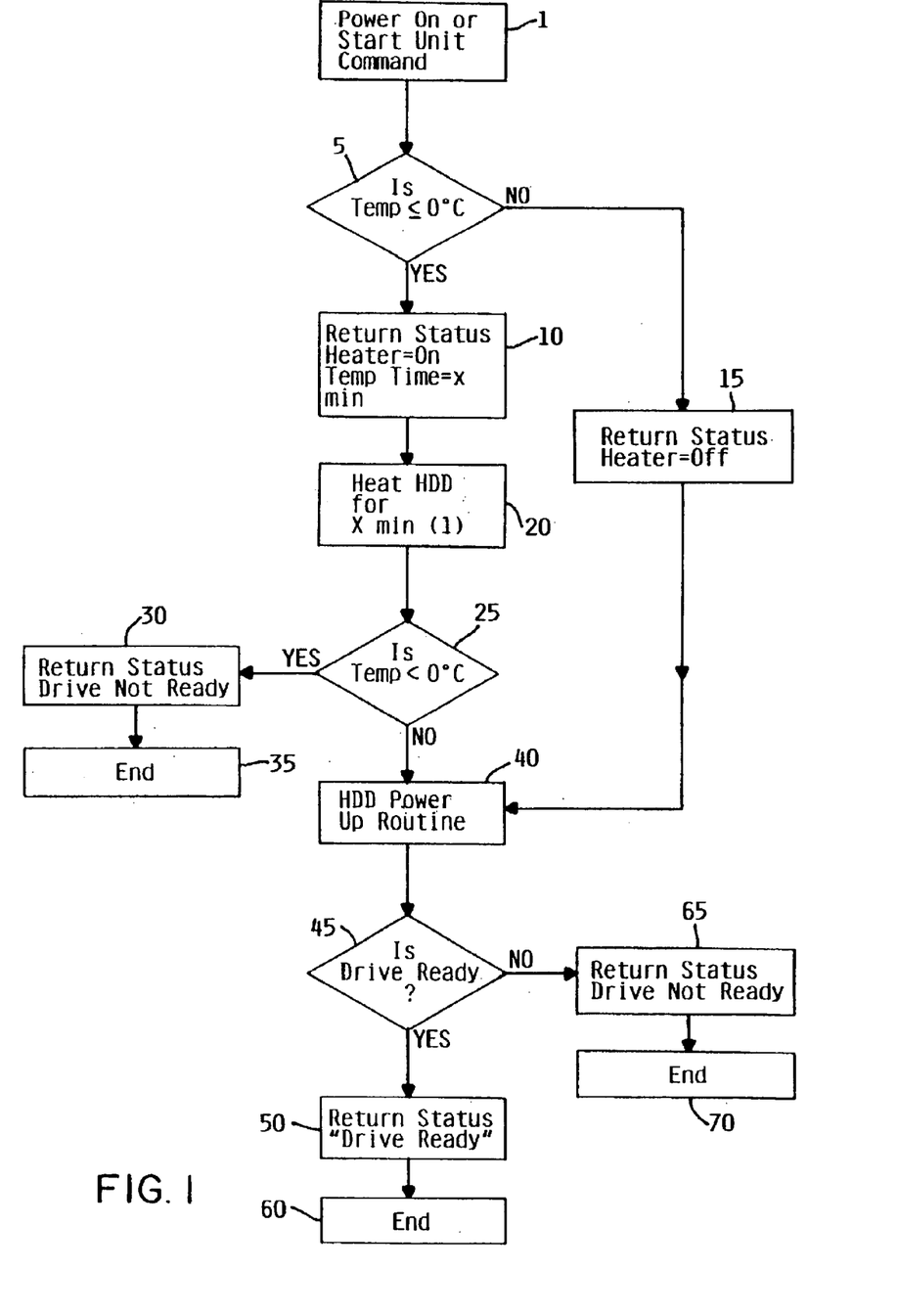
FIG. 1 is a flowchart depicting an example power up routine according to an example embodiment of the present invention.

In FIG. 1, after the power on or start command in step 1, the thermistor 120 indicates whether the temperature of the disk drive unit 102 is less than or equal to 0° Celsius in step 5. If the temperature is greater than 0° Celsius, the controller 114 receives the status that the heater is off in step 15, and the hard disk drive power-up routine begins in step 40. However, if the temperature is less than or equal to 0° Celsius, the controller 114 receives the return status that the heater is to be turned on in step 10, and the hard disk drive is heated for a predetermined amount of time in step 20. In step 25, it may once again be determined whether the temperature is less than 0o Celsius. If the temperature is less than 0° Celsius, the controller 114 receives the status that the disk drive is not ready, and the power-on routine is ended in step 35. However, if the temperature is 0° Celsius or more, as determined in step 25, the hard disk drive power-up routine in step 40 commences. In step 45, a determination may be made as to whether the hard disk drive is ready. If yes, the corresponding status may be reported to the controller 114, and the power-on routine is ended in step 60. However, if the disk drive is not ready, such status may be reported to the controller 114 in step 65, and the power-up routine is ended in step 70.

In the alternative, the spin-up times may be experimentally determined for each motor by measuring the bearing temperature versus time of current injection into the windings of the spindle motor stator.

Figure 6:
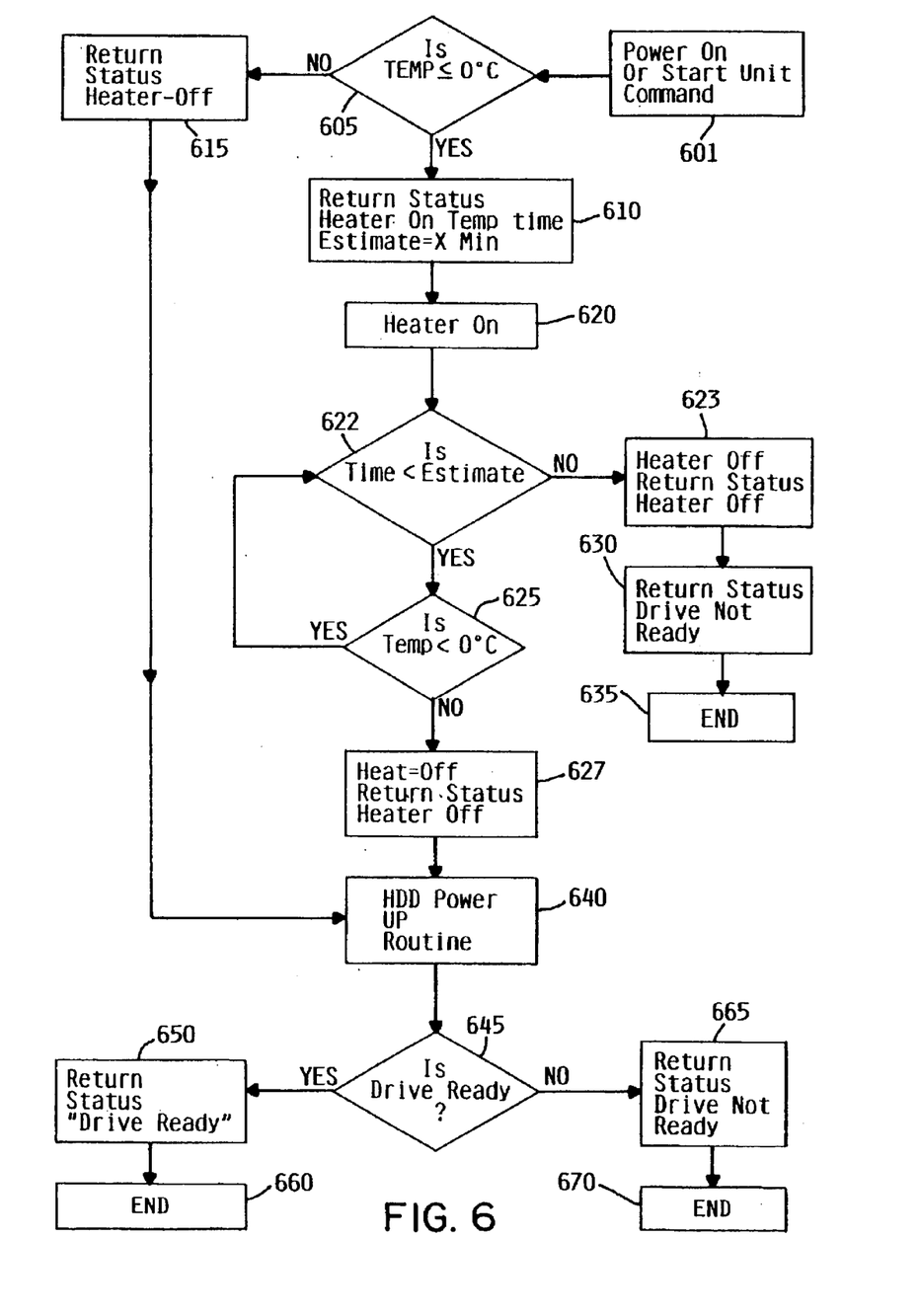
FIG. 6 is a flowchart depicting an example power up routine according to another example embodiment of the present invention.

For example, as shown in FIG. 6, a closed-loop feedback to the controller 114 may be provided for the heating cycle.

After the power on or start command in step 601, the thermistor 120 indicates whether the temperature of the disk drive unit 102 is less than or equal to 0° Celsius in step 605. If the temperature is greater than 0° Celsius, the controller 114 receives the status that the heater is off in step 615, and the hard disk drive power-up routine begins in step 640. However, if the temperature is less than or equal to 0° Celsius, the controller 114 receives the return status that the heater is to be turned on in step 610 for the expected or estimated amount of time for sufficient heating, and the hard disk drive is heated for the estimated amount of time, X minutes, in step 620. In step 622, a determination is made as to whether the actual amount of time of heating is less than estimated amount of time X. If yes, it may once again be determined whether the temperature is less than 0° Celsius, as in step 625. Then, if the temperature is less than 0° Celsius, the determination is once again made as to whether the actual amount of time of heating is less than the estimated amount of time X. If the temperature is not less than 0° Celsius, then the HDD power up routine in step 640 commences. In step 645, a determination may be made as to whether the hard disk drive is ready. If yes, the corresponding status may be reported to the controller 114 in step 650, and the power-on routine is ended in step 660. However, if the disk drive is not ready, such status may be reported to the controller 114 in step 665, and the power-up routine is ended in step 670. But, if the actual time of heating is not less then the estimated time X in step 622, the controller 114 receives the status that the heater is off in step 623, and the further status that the disk drive is not ready in step 630, and the power-on routine is ended in step 635.

Figure 5:
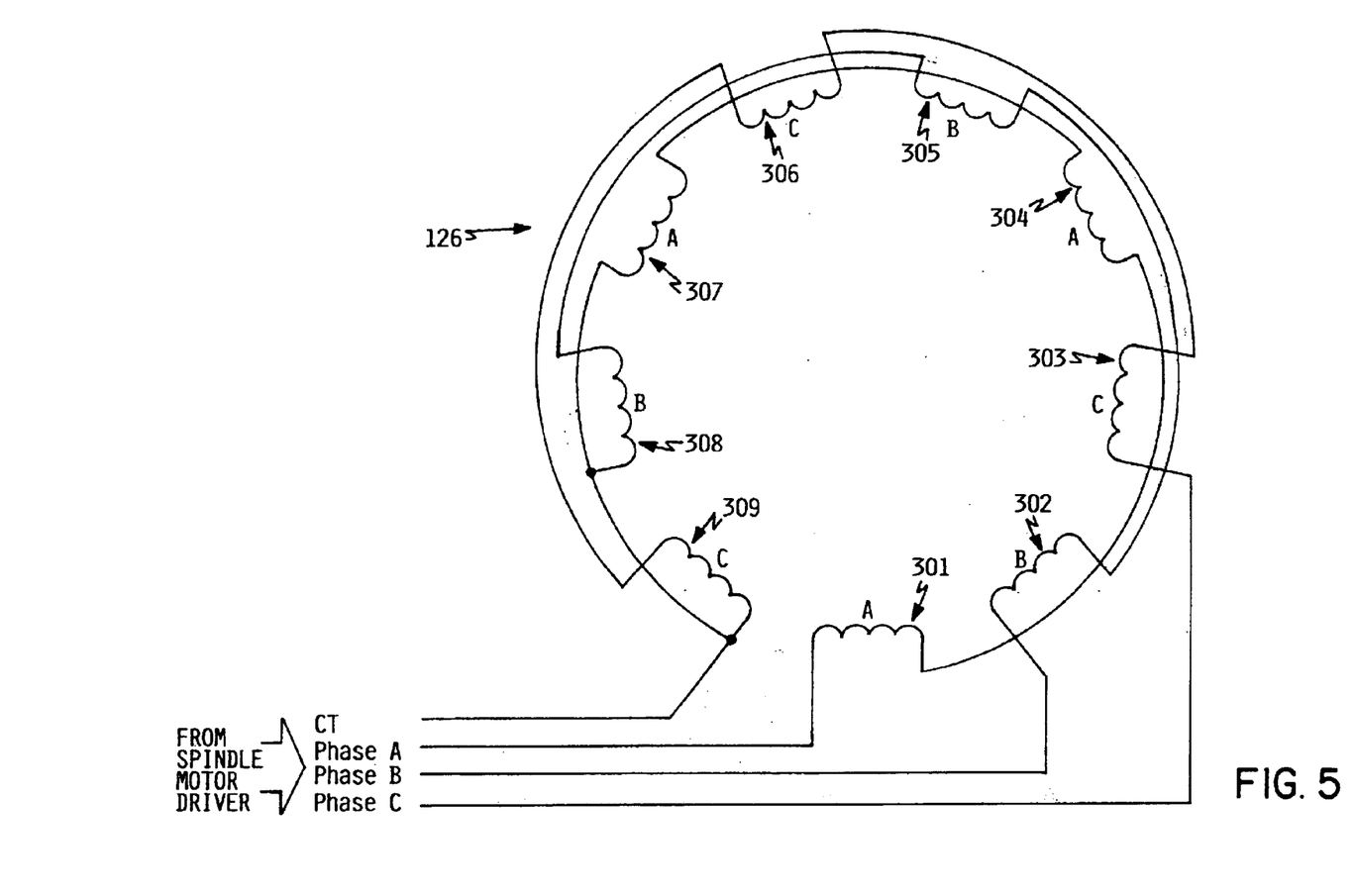
FIG. 5 is an example of a disk drive spindle motor in accordance with an example embodiment of the present invention.

A second example embodiment of the present invention is similar to the first example embodiment described above except that, instead of applying a DC, AC or pulsed current, the phases of spindle motor assembly 126 are excited to rock the spindle motor assembly 126 in a "back-and-forth" manner such that heat may be dissipated within the windings and, as a result, heat may be dissipated into the grease. As shown in FIG. 5, spindle motor assembly 126 is a brushless DC motor having an electric stator with windings and a permanent magnetic rotor. The stator windings are connected in a three-phase wye configuration having a central tap, although other numbers of phases or other configurations such as a delta configuration are possible. Preferably, stator windings 301–309 are arranged with three poles per phase connected in series, for a total of nine poles, although the number of poles may vary. The three phases of the stator windings are driven by respective drive transistors in the spindle motor driver. All poles of a given phase are driven by a common drive circuit on the associated phase line, e.g., poles 301, 304 and 307 are connected in series and driven by phase line A. However, it would alternatively be possible to provide separate drive transistors for the different poles of the same phase.

FIG. 5 represents a typical disk drive spindle motor configuration. The specific configuration of phases, poles and other matters is not critical to the present invention. A disk constraining mechanism as described herein could be used in a disk drive having any of various spindle motor configurations. However, with respect to the present invention, the amount of time that the phases are rocked to generate heat to be dissipated within the windings may be determined by the exemplary methodologies described above.

A third example embodiment of the present invention, as shown in FIG. 4, includes a heating element 150 that may be directly applied to the outside of the spindle motor assembly 126, or may be alternatively integrated within spindle motor assembly 126, adjacent to the bearing assembly, as shown in FIG. 3. For example, heating element 150 may include a resistive heating element that may be mechanically bonded to stator 135, shown in FIG. 3, or another exterior portion of spindle motor assembly 126, including mount flange 134. Further, the heating element 150, which may be a resistive heating element, may be disposed in the central area 137 in the spindle motor assembly 126, shown in FIG. 3. The heating element 150 and thermistor would be cabled within the same cable bundle as the 3 Phases and Neutral (assuming a Y configuration), and would be mounted to heat only the spindle motor assembly as quickly and efficiently as possible.

Figure 7A:
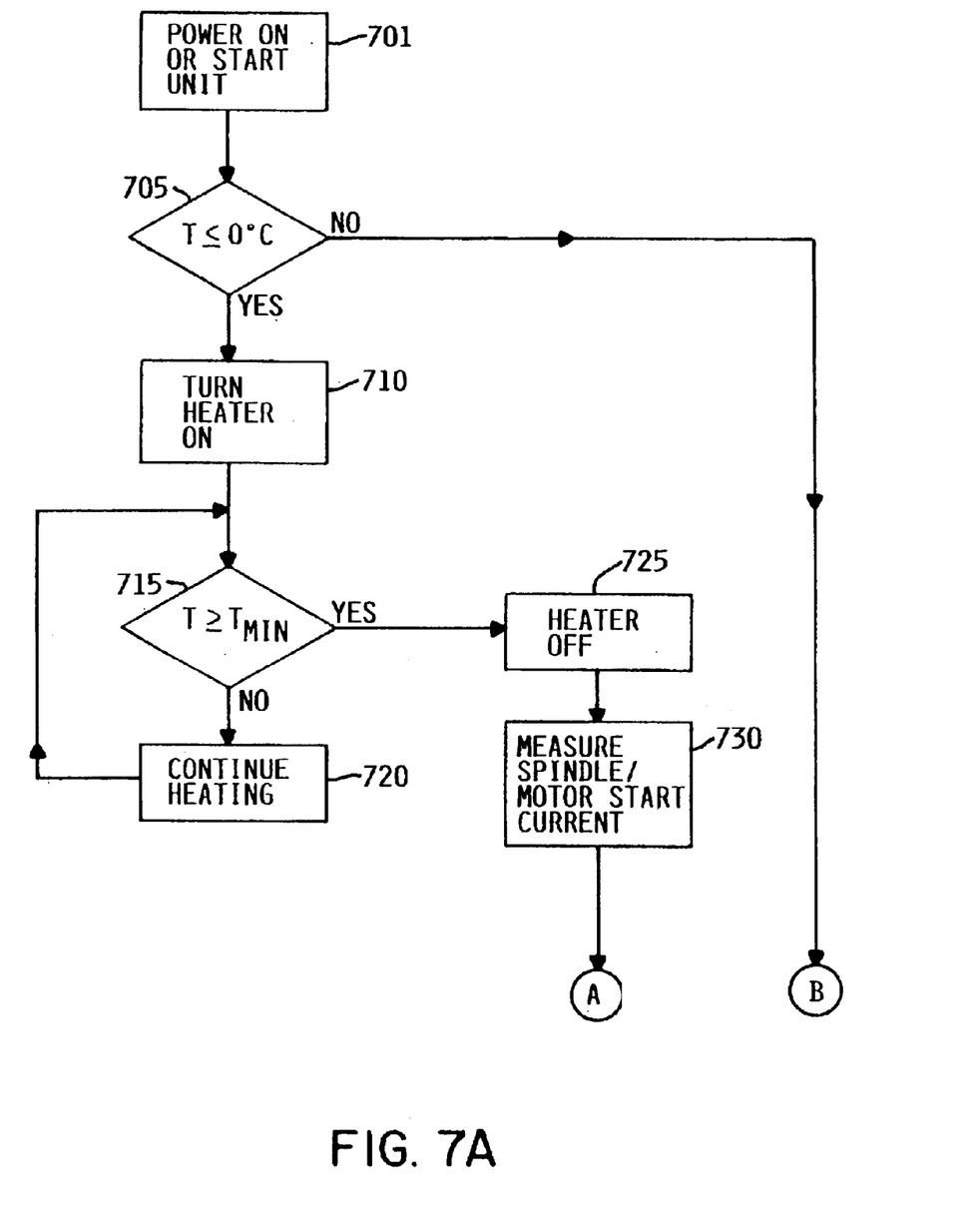
FIG. 7 is a flowchart depicting an example power up routine according to another example embodiment of the present invention.
Figure 7B:
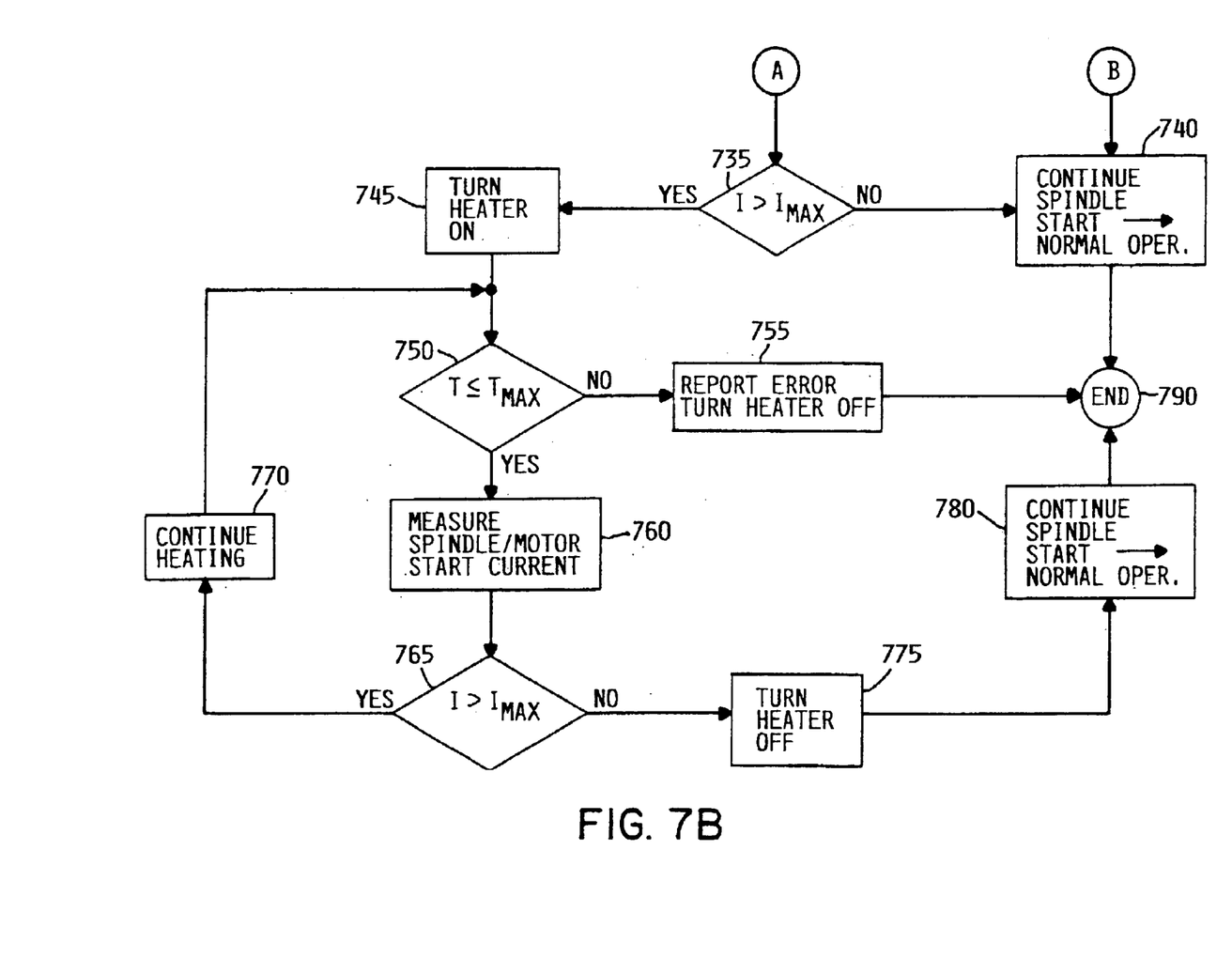

A fourth example embodiment of the present invention is shown in FIG. 7 that shows a power-up routine that utilizes a current I that is being applied to start the spindle motor assembly 126. That is, it is presently possible for spindle motor controllers to measure the amount of current that is presently applied to cause a spindle motor assembly to start. Accordingly, by the present invention, after the power on or start command in step 701, the thermistor 120 indicates whether the temperature of the disk drive unit 102 is less than or equal to 0° Celsius in step 705. If the temperature is greater than 0° Celsius, then spindle start up and normal operation proceed in step 740, and the power-on routine ends in step 790. However, if the temperature of the disk drive unit 102 is less than or equal to 0° Celsius, the heating element 150 is turned on, and thermistor 120 indicates whether the temperature T of the disk drive unit 102 is greater than or equal to a minimum threshold temperature $T_{min}$ in step 715. If the temperature T is less than the minimum threshold temperature $T_{min}$, heating of the disk drive unit 102 continues in step 720, and the power up routine returns to the determination of step 715. However, if the $T \geq T_{min}$, the heater is turned off in step 725.

Then, in step 730, the current I applied to the spindle motor assembly 126 is measured in step 730 by a current sensor therein (not shown) which is known in the art, and controller 114 determines if I is greater than a maximum threshold current $I_{max}$, which is maximum allowable temperature for spindle motor assembly 126 start up. If I is less than $I_{max}$, then spindle start up and normal operation proceed in step 740, and the power-on routine ends in step 790. However if I is greater than $I_{max}$, the heating element 150 is turned on again in step 745, and thermistor 120 determines whether the temperature T of the disk drive unit 102 is less than or equal to the maximum threshold temperature $T_{max}$ in step 750. If temperature T is greater than the maximum threshold temperature $T_{max}$, an error report is made to controller 114 in step 755, and the start-up routine ends at step 790. However, if the temperature T of the disk drive unit 102 is less than or equal to the maximum threshold temperature $T_{max}$ in step 750, the current I applied to the spindle motor assembly 126 is measured again in step 767, and controller 114 determines if I is greater than a maximum threshold current $I_{max}$ in step 765. If I is greater than $I_{max}$, heating of the spindle motor assembly 126 continues in step 770, and the start-up routine returns to step 750. But if I is less than $I_{max}$, controller 114 turns off the heating element 150, then spindle start up and normal operation proceed in step 780, and the power-on routine ends in step 790.

By this fourth embodiment, the spindle start current I serves as an indicator of spindle friction and therefore provides a further indication that the spindle motor assembly 126 is ready for normal operation.

It should be noted that the method embodiments of the present invention, which have been described above, may be applied to the various apparatus embodiments of the present invention, which have been described above. For instance, the method embodiments may be applied to any computer to prevent cold temperature induced damage to a spindle motor assembly of a direct access storage device (DASD) thereof.

This concludes the description of the example embodiments of the present invention. Although the present invention has been described with reference to illustrative embodiments thereof, it should be understood that numerous other modifications and embodiments can be devised by those skilled in the art that will fall within the scope and spirit of the principals of the invention. More particularly, reasonable variations and modifications are possible in the component parts and/or arrangements of the subject combination arrangement within the scope of the foregoing disclosure, the drawings and the appended claims without department from the spirit of the invention. In addition to variations and modifications in the component parts and/or arrangements, alternative uses will also be apparent to those skilled in the art.

We claim:

1. A method for preventing cold temperature induced damage to a spindle motor assembly of a direct access storage device (DASD) after receipt of a power-on command for the DASD, comprising:
    (a) measuring a temperature of said DASD;
    (b) starting spinning operation of said spindle motor assembly immediately unless the temperature measured in step (a) is below a minimum threshold temperature for normal operation;
    (c) if the temperature measured in step (a) is below the minimum threshold temperature for normal operation, applying a current to windings of said spindle motor assembly to raise the temperature of said spindle motor assembly; and
    (d) starting spinning operation of said spindle motor assembly after the temperature has been raised.

2. A method according to claim 1, wherein said current applied in step (c) is any one of a DC current, an AC current and a pulsed current.

3. A method according to claim 2, wherein said current is applied to said windings of said spindle motor assembly for an amount of time required for the resistance of a respective one of said windings to reach a predetermined value corresponding to the applied current.

4. A method according to claim 2, wherein said current is applied to said windings of said spindle motor assembly for an amount of time required for the electrical resistance of a respective one of said windings to reach a predetermined value based on a table stored in a controller in said DASD.

5. A method according to claim 4, wherein the values of resistance of said windings corresponding to current values stored in said table in said controller are predetermined by measuring changing resistance values in respective ones of said windings in accordance with a change in an amount of current or voltage applied to the respective winding.

6. A method according to claim 2, wherein said current applied to said windings of said spindle motor assembly in step (c) corresponds to a measured temperature of said DASD in a table stored in a controller of said DASD.

7. A method according to claim 6, wherein said spindle motor assembly includes bearings, and wherein said current is applied to said windings for an amount of time required for the bearings of said spindle motor assembly to reach a predetermined minimum threshold temperature.

8. A method according to claim 2, wherein said temperature of said DASD is measured in step (a) using a thermistor on a card therein.

9. A method according to claim 2, wherein said temperature of said DASD is measured in step (a) using a sensor on said spindle motor assembly.

10. A method for preventing cold temperature induced damage to a spindle motor assembly of a direct access storage device (DASD), comprising:

measuring a temperature of said DASD;

exciting the phases of said spindle motor assembly for an amount of time required for the temperature of said spindle motor assembly to rise to a minimum threshold temperature for normal operation; and starting spinning operation of said spindle motor assembly, wherein exciting said phases of said spindle motor assembly includes rocking said phases back-and-forth in a clockwise-counterclockwise manner at a predetermined rate of speed.

11. A method according to claim 10, wherein said phases of said spindle motor assembly are excited until a bearing assembly of said spindle motor assembly reaches a minimum threshold temperature.

12. A method according to claim 11, wherein said phases of said spindle motor assembly are excited until the grease of said bearing assembly of said spindle motor assembly reaches a minimum threshold temperature.

13. A method according to claim 10, wherein said temperature of said DASD is measured using a thermistor on a card therein.

14. A method according to claim 10, wherein said temperature of said DASD is measured using a sensor on said spindle motor assembly.

15. A method for preventing cold temperature induced damage to a spindle motor assembly of a direct access storage device (DASD) after receipt of a power-on command for the DASD, comprising:

(a) measuring a temperature of said DASD;
(b) starting spinning operation of said spindle motor assembly immediately unless the temperature measured in step (a) is below a minimum threshold temperature for normal operation;
(c) heating said spindle motor assembly to raise the temperature thereof; and
(d) starting spinning operation of said spindle motor assembly after the temperature has been raised.

16. A method according to claim 15, wherein heating said spindle motor assembly in step (c) is performed for an amount of time that corresponds to the measured temperature of said DASD in a table stored in a controller of said DASD.

17. A method according to claim 15, wherein said spindle motor assembly includes bearings, and wherein heating said spindle motor assembly including applying a current to said windings for an amount of time required for the bearings of said spindle motor assembly to reach a predetermined minimum threshold temperature.

18. A method according to claim 15, wherein said temperature of said DASD is measured in step (a) using a thermistor on a card therein.

19. A method according to claim 15, wherein said temperature of said DASD is measured in step (a) using a thermistor on said spindle motor assembly.

20. A program for preventing cold temperature induced damage to a spindle motor assembly of a direct access storage device (DASD), comprising:

a code for measuring a temperature of said DASD using a sensor on said motor spindle assembly;

a code for applying a current to windings of said spindle motor assembly for an amount of time required for the temperature of said spindle motor assembly to rise to a minimum threshold temperature for normal operation; and a code for starting spinning operation of said spindle motor assembly when the temperature of said spindle motor assembly has risen to the minimum threshold temperature for normal operation.

21. A program according to claim 20, wherein said current is any one of a DC current, an AC current and a pulsed current.

22. A program according to claim 21, wherein said code for applying said current applies said current to said windings of said spindle motor assembly for an amount of time required for the resistance on a respective one of said windings to reach a predetermined value corresponding to the applied current.

23. A program according to claim 22, wherein said current is applied to said windings of said spindle motor assembly the amount of time required for the resistance on a respective one of said windings to reach a predetermined value based on a table stored in a controller in said DASD.

24. A program according to claim 23, wherein the values of resistance of said windings corresponding to current values stored in said table in said controller are predetermined by measuring changing resistance values in respective ones of said windings in accordance with a change in an amount of current or voltage applied to the respective winding.

25. A program according to claim 21, wherein said current applied to said windings of said spindle motor assembly corresponds to the measured temperature of said DASD in a table stored in a controller of said DASD.

26. A program according to claim 25, wherein said current is applied to said windings for an amount of time required for the bearings of said spindle motor assembly to reach a predetermined minimum threshold temperature.

27. A program for preventing cold temperature induced damage to a spindle motor assembly of a direct access storage device (DASD), comprising:

a code for measuring a temperature of said DASD;

a code for exciting the phases of said spindle motor assembly for an amount of time required for the temperature of said spindle motor assembly to rise to a minimum threshold temperature for normal operation; and a code for starting spinning operation of said spindle motor assembly when the temperature of said spindle motor assembly has risen to the minimum threshold temperature for normal operation, wherein exciting said phases of said spindle motor assembly includes rocking said phases back-and-forth in a clockwise-counterclockwise manner at a predetermined rate of speed.

28. A program according to claim 27, wherein said phases of said spindle motor assembly are excited until a bearing assembly of said spindle motor assembly reaches a minimum threshold temperature.

29. A program according to claim 28, wherein said phases of said spindle motor assembly are excited until the grease of said bearing assembly of said spindle motor assembly reaches a minimum threshold temperature.

30. A program according to claim 27, wherein said temperature of said DASD is measured by a thermistor on a card therein.

31. A program according to claim 27, wherein said temperature of said DASD is measured by a thermistor on said spindle motor assembly.

32. A program for preventing cold temperature induced damage to a spindle motor assembly of a direct access storage device (DASD), comprising:

a code for measuring a temperature of said DASD using a thermistor on said spindle motor assembly;

a code for heating said spindle motor assembly for an amount of time required for the temperature of said spindle motor assembly to rise to a minimum threshold temperature for normal operation; and a code for starting spinning operation of said spindle motor assembly when the temperature of said spindle motor assembly has risen to the minimum threshold temperature for normal operation.

33. A program according to claim 32, wherein said heat is applied to said spindle motor assembly for an amount of time that corresponds to the measured temperature of said DASD in a table stored in a controller of said DASD.

34. A program according to claim 32, wherein heating said spindle motor assembly includes applying a current thereto for an amount of time required for the bearings of said spindle motor assembly to reach a predetermined minimum threshold temperature.

35. A method for preventing cold temperature induced damage to a spindle motor assembly of a direct access storage device (DASD), said method comprising:

measuring a temperature of said DASD;

heating said spindle motor assembly to raise the temperature of said spindle motor assembly to a minimum threshold temperature for normal operation when the measured temperature of said DASD is less than 0° Celsius;

halting the heating of said spindle motor assembly when said spindle motor assembly has been heated for a time equal to or greater than a predetermined threshold amount of time, applying a current to said spindle motor assembly, measuring the current applied to spindle motor assembly and comparing the measured current to a maximum threshold current, wherein spinning operation of said spindle motor commences when the measured current is less than the maximum threshold current; and re-heating said spindle motor assembly when the measured current exceeds the maximum threshold current, re-applying a current to said spindle motor assembly when a measured temperature of the re-heated spindle motor assembly is less than or equal to a maximum threshold temperature, and re-measuring the current re-applied to spindle motor assembly and comparing the re-measured current to the maximum threshold current, wherein the re-heating ceases and an error report is issued when the re-measured temperature of the re-heated spindle motor assembly is greater than the maximum threshold temperature, wherein further re-heating of said spindle motor assembly continues when the re-measured current exceeds the maximum threshold current, and said method returns to said re-heating of said spindle motor assembly, and wherein further re-heating of said spindle motor assembly ceased when the re-measured current exceeds the maximum threshold current, and spinning operation of said spindle motor commences.

36. A processor that is able to prevent cold temperature induced damage to a spindle motor assembly of a direct access storage device (DASD) thereof, a thermistor being disposed on said spindle motor assembly, said processor comprising:

means for measuring a temperature of said DASD using said thermistor;

means for applying a current to windings of said spindle motor assembly for an amount of time required for the temperature of said spindle motor assembly to rise to a minimum threshold temperature for normal operation; and means for starting spinning operation of said spindle motor assembly when the temperature of said spindle motor assembly has risen to the minimum threshold temperature for normal operation.

37. A processor according to claim 36, wherein said current is any one of a DC current, an AC current and a pulsed current.

38. A processor according to claim 37, wherein said means for applying said current applies said current to said windings of said spindle motor assembly for an amount of time required for the resistance on a respective one of said windings to reach a predetermined value corresponding to the applied current.

39. A processor according to claim 37, wherein said current is applied to said windings of said spindle motor assembly the amount of time required for the resistance on a respective one of said windings to reach a predetermined value based on a table stored in a controller in said DASD.

40. A processor according to claim 39, wherein the values of resistance of said windings corresponding to current values stored in said table in said controller are predetermined by measuring changing resistance values in respective ones of said windings in accordance with a change in an amount of current or voltage applied to the respective winding.

41. A processor according to claim 37, wherein said current applied to said windings of said spindle motor assembly corresponds to the measured temperature of said DASD in a table stored in a controller of said DASD.

42. A processor according to claim 41, wherein said current is applied to said windings for an amount of time required for the bearings of said spindle motor assembly to reach a predetermined minimum threshold temperature.

43. A method according to claim 1, wherein step (c) is conducted for an amount of time required for the temperature of said spindle motor assembly to rise to the minimum threshold temperature for normal operation.

44. A method according to claim 1, wherein step (d) comprises supplying electrical power to said spindle motor assembly, measuring the current drawn by said spindle motor assembly, and continuing with step (d) only if the measured current is less than a predetermined maximum current value.

45. A method according to claim 44, further comprising applying a current to the windings of said spindle motor assembly again to raise the temperature thereof above the minimum threshold temperature for normal operation if the measured current is not less than the maximum current value.

46. A method according to claim 9, wherein the sensor is a thermistor.

47. A method according to claim 14, wherein the sensor is a thermistor.

48. A method according to claim 15, wherein step (c) is conducted for an amount of time required for the temperature of said spindle motor assembly to rise to the minimum threshold temperature for normal operation.

49. A method according to claim 15, wherein step (d) comprises supplying electrical power to said spindle motor assembly, measuring the current drawn by said spindle motor assembly, and continuing with step (d) only if the measured current is less than a predetermined maximum current value.

50. A method according to claim 49, further comprising applying a current to the windings of said spindle motor assembly again to raise the temperature thereof above the minimum threshold temperature for normal operation if the measured current is not less than the maximum current value.

51. A method according to claim 19, wherein the sensor is a thermistor.

52. A method according to claim 4, wherein the sensor is a thermistor.

* * * * *